(12) United States Patent
Oliva-Perez et al.

(10) Patent No.: US 10,713,817 B2
(45) Date of Patent: Jul. 14, 2020

(54) EXTERNAL ENVIRONMENT COLOR CHANGE DETECTION DEVICE FOR VEHICLES

(71) Applicants: Oriol Oliva-Perez, Palm City, FL (US); Mohammad Salaheldin Sallam, Jensen Beach, FL (US)

(72) Inventors: Oriol Oliva-Perez, Palm City, FL (US); Mohammad Salaheldin Sallam, Jensen Beach, FL (US)

( * ) Notice: Subject to any disclaimer, the term of this patent is extended or adjusted under 35 U.S.C. 154(b) by 0 days.

(21) Appl. No.: 16/360,597

(22) Filed: Mar. 21, 2019

(65) Prior Publication Data
US 2019/0295292 A1 Sep. 26, 2019

Related U.S. Application Data

(60) Provisional application No. 62/646,119, filed on Mar. 21, 2018.

(51) Int. Cl.
| | | |
|---|---|---|
| *G06T 7/90* | (2017.01) | |
| *B60Q 9/00* | (2006.01) | |
| *B60R 11/04* | (2006.01) | |

(52) U.S. Cl.
CPC ............... *G06T 7/90* (2017.01); *B60Q 9/008* (2013.01); *B60R 11/04* (2013.01); *B60R 2300/302* (2013.01); *B60R 2300/8093* (2013.01); *G06T 2207/10024* (2013.01); *G06T 2207/30236* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 6,985,073 B1 * | 1/2006 | Doan | B60Q 1/525 340/425.5 |
| 9,648,107 B1 * | 5/2017 | Penilla | B60L 58/12 |
| 9,783,125 B2 * | 10/2017 | Drummond | B60R 1/088 |
| 9,922,559 B1 * | 3/2018 | Inoue | G08G 1/095 |
| 10,347,124 B1 * | 7/2019 | Grossberg | G08G 1/095 |
| 10,471,958 B2 * | 11/2019 | Remillard | B60W 50/14 |
| 2002/0005790 A1 * | 1/2002 | Georgalis | G08G 1/096 340/929 |

(Continued)

FOREIGN PATENT DOCUMENTS

WO WO-2017042710 A1 * 3/2017 ............ B60W 40/04

*Primary Examiner* — Fekadeselassie Girma
(74) *Attorney, Agent, or Firm* — McHale & Slavin, P.A.

(57) ABSTRACT

A device that uses color recognition systems designed to alert distracted drivers/operators in non-moving vehicles, to reduce their time of response to unnoticed external environment color changes. The device provides a method to image a vehicle's external environment color change by detecting and analyzing color variations of the traffic light signals or proceeding vehicle's brake lights. The device can emit a sound and/or vibration when the device recognizes a color change and the operator of the vehicle does not react, as in the case of a distracted operator. The device employs a camera, an accelerometer, a buzzer, an algorithm, a CPU and a power source. The device can be installed on the windshield of a vehicle, fully integrated into a vehicle, or partially integrated, wherein a mobile device App may be employed.

15 Claims, 17 Drawing Sheets

(56) References Cited

U.S. PATENT DOCUMENTS

| | | | | |
|---|---|---|---|---|
| 2006/0119126 A1* | 6/2006 | Damian | ............... | B60Q 1/302 |
| | | | | 296/99.1 |
| 2008/0255754 A1* | 10/2008 | Pinto | ............... | G01C 21/3691 |
| | | | | 701/119 |
| 2012/0109421 A1* | 5/2012 | Scarola | ............... | G08G 1/163 |
| | | | | 701/2 |
| 2012/0140080 A1* | 6/2012 | Taylor | ............... | B60C 23/0408 |
| | | | | 348/148 |
| 2013/0141231 A1* | 6/2013 | Aberizk | ............... | B60Q 1/302 |
| | | | | 340/467 |
| 2014/0222280 A1* | 8/2014 | Salomonsson | ............ | B60T 7/22 |
| | | | | 701/28 |
| 2014/0368324 A1* | 12/2014 | Seifert | ............... | G08G 1/166 |
| | | | | 340/435 |
| 2017/0124870 A1* | 5/2017 | Weber | ............... | G08G 1/09623 |
| 2017/0197617 A1* | 7/2017 | Penilla | ............... | B60W 30/09 |
| 2017/0217421 A1* | 8/2017 | Theodosis | ............. | G08G 1/166 |
| 2018/0099678 A1* | 4/2018 | Absmeier | ......... | A61M 21/0094 |
| 2018/0334175 A1* | 11/2018 | Boule | ............... | B60W 40/08 |
| 2018/0354462 A1* | 12/2018 | Pasumarthi | ........... | B60S 1/0888 |
| 2019/0012551 A1* | 1/2019 | Fung | ............... | G06K 9/00825 |

* cited by examiner

TIME = X

TIME = X + DELAY

|  |  |  |
|---|---|---|
| ROI SELECT E.G. RED LEFT BRAKE | 44 | Image(s) original size: 640X450 |
|  | 45 |  |
|  | 46 | Color Analysis: RED_#1_LEFT_BRAKE |
|  | 47 | HSV low, up: (169, 100, 100) , (189, 255, 255) |
|  | 48 | Kernel size: 3 |
|  | 49 |  |
|  | 50 | sc7db_pres/08-46-27.jpg |
|  | 51 | ROI: 170 x 178 |
|  | 52 | Trin ROI: (-25, -60, 80, 90) |
|  | 53 | Image Oversized: 2 |
|  | 54 |  |
|  | 55 | sc7db_pres/08-46-29.jpg |
|  | 56 | ROI: 170 x 178 |
|  | 57 | Trin ROI: (-25, -60, 80, 90) |
|  | 58 | Image Oversized:2 |
| IMAGE A | 59 |  |
|  | 60 | The # of mask pixels in sc7db_pres/08-46-27.jpg is :703 |
| IMAGE B | 61 | The # of mask pixels in sc7db_pres/08-46-29.jpg is: 855 |
|  | 62 | Pixels_difference: 152 |
|  | 63 | ref_px: 855.0 |
|  | 64 | Diff_pctge: 0.178 |
|  | 65 | Threshold: 0.5 (Same images: Diff_pctge <=Thrsh-1 |
| ROI SELECT E.G. RED RIGHT BRAKE | 66 |  |
|  | 67 | Color Analysis: RED_#1_RIGHT_BRAKE |
|  | 68 | HSV low, up: (169, 100, 100) , (189, 255, 255) |
|  | 69 | Kernel size: 3 |
|  | 70 |  |
|  | 71 | sc7db_pres/08-46-27.jpg |
|  | 72 | ROI: 170 x 153 |
|  | 73 | Trim ROI: (210, 150, 80, 90) |
|  | 74 | Image Oversized: 2 |
|  | 75 |  |
|  | 76 | sc7db_pres/08-46-29.jpg |
|  | 77 | ROI: 170 x 153 |
|  | 78 | Trin ROI: (210, 150, 80, 90) |
|  | 79 | Image Oversized: 2 |
| IMAGE A | 80 |  |
|  | 81 | The # of mask pixels in sc7db_pres/08-46-27.jpg is: 447 |
| IMAGE B | 82 | The # of mask pixels in sc7db_pres/08-46-29.jpg is:401 |
|  | 83 | Pixels_difference:46 |
|  | 84 | ref_px: 447.0 |
|  | 85 | Diff_pctge: 0.103 |
|  | 86 | Threshold: 0.5 (Same images: Diff_pctge <= Thrsh-1 |
| RESULT | 87 |  |
|  | 88 | RESULT: Pictures are the same |
|  | 89 | Red_is: True |

FIG. 22

EXTERNAL ENVIRONMENT COLOR CHANGE DETECTION DEVICE FOR VEHICLES

PRIORITY CLAIM

In accordance with 37 C.F.R. 1.76, a claim of priority is included in an Application Data Sheet filed concurrently herewith. Accordingly, the present invention claims priority to U.S. Provisional Patent Application No. 62/646,119, entitled "Traffic Detection Change Device", filed Mar. 21, 2018. The contents of the above referenced application are incorporated herein by reference.

FIELD OF THE INVENTION

The present invention relates to a vehicle device that uses color recognition systems designed to alert distracted drivers/operators in non-moving vehicles, to reduce their time of response to unnoticed external environment color changes.

BACKGROUND OF THE INVENTION

A study had estimated that the total number of vehicles on the planet would surpass one billion sometime during 2010. Most will commute through every day traffic and engage in the imposed traffic signs, signals and rules.

In the United States, Washington, D.C., tops the list of most congested cities according to the study, followed by Los Angeles, San Francisco, New York and San Jose. In the nation's capital, commuters spent an average of 82 hours of their year, nearly 1 percent of their time, in bumper-to-bumper traffic. In L.A., they spent about 80 hours, and in New York, around 74. During that time, drivers/operators tend to get distracted with other things to do, especially when waiting for the red light to turn green or when the vehicle in front of theirs starts moving.

One of the top reasons for traffic accidents is distracted driving. Distracted driving is any activity that diverts attention from driving, including talking or texting on the phone, eating and drinking, talking to people in the vehicle, fiddling with the stereo, entertainment or navigation system; anything that takes the person's attention away from the task of safe driving. Distracted driving can be as simple as not paying full attention to the simplest road rules, signs and traffic lights. These distractions can, at best, create minor vehicle accidents such as "fender benders" that do not involve injuries to the drivers or passengers, and, at worst, threaten the vehicle occupant's life. According to a recent report by the U.S. Department of Transportation, the 2016 passenger vehicle fatality rate totaled 23,714, which is the highest number since 2008. Passenger vehicles include passenger cars and light trucks. Distracted driving contributed to 3,450 fatalities in 2016, and 444 of those deaths were linked to cell phone use.

Another reason is road rage. The NHTSA and the Auto Vantage auto club show that aggressive driving and road rage are causing serious problems on our roads. Sixty-six percent of traffic fatalities are caused by aggressive driving. Half of the drivers who are on the receiving end of an aggressive behavior, such as horn honking, a rude gesture, or tailgating, admit to responding with aggressive behavior themselves.

The authors of this work believe that new and "machine-decision-making" technologies such as self-driving cars will eventually enhance people's safety to a very high degree, with solutions to most of the vehicle's operation problems described above. However, these new technologies and regulations are still developing and might require years to spread to the public. Therefore, it is believed that property damage and the consequences to the people or, at worst, fatalities due to distracted vehicle operation will continue, at least until these new vehicle technologies and regulations are implemented.

Thus, there is a need for a solution on current vehicles to mitigate the hazards due to distracted driving and operating.

SUMMARY OF THE INVENTION

A device designed to detect and alert distracted drivers/operators of unnoticed external environment color changes when operating a vehicle. An example of a condition for detection is when the vehicle equipped with the device is not moving (stopped) and other vehicles are moving, or a traffic light has changed. Examples of method for detection are the device searching for "green" color changes in the case of the traffic light signals, and "red" color changes in the tail-brake lights zone in the case of a vehicle in front. An example of a method of an alert to the driver/operator is triggering a buzzer, for example a 'beep' sound and/or vibration, when the device assumes that the driver/operator is distracted by not responding to the external environment color changes. Examples of driver/operator distraction could be: not moving the vehicle after the traffic light signal turns green or not moving the vehicle after the tail lights or brake lights of the vehicle in front go off, indication that the vehicle in front shall move.

In a preferred embodiment, the device is a system composed of a camera to capture the operator's external environment (data), an accelerometer to gather the dynamic conditions of the vehicle such as moving or stopping (data), a buzzer to alert the distracted operator, the software which includes the algorithm (code) and collected data, a central processing unit (CPU)/memory to process and store the software, and a battery or connection to a power source to provide power to the device.

Some examples of device-to-vehicle installation could be: (1) the device installed as an accessory behind the windshield of current and future vehicles; (2) a separated camera mounted inside or outside the vehicle, an OBD (on-board diagnostics) connector plugged into the vehicle's diagnostic port to collect its dynamic conditions and an App installed into the operator's mobile smart device (i.e. cell phone) to process, store the data (collected wirelessly from the camera and OBD connector) and alarm; (3) as an integrated OEM (original equipment manufacturer) build-in system for new vehicles.

Other examples/objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

BRIEF DESCRIPTION OF THE DRAWINGS

The drawing figures depict one or more implementations in accordance with the present teachings, by way of example only, not by way of limitation. In the figures, like reference numerals refer to the same or similar elements.

FIG. 18b is a mask image of FIG. 18a;

FIG. 19b is a mask image of FIG. 19a;

FIG. 20b is a mask image of FIG. 20a;

FIG. 21b is a mask image of FIG. 21a;

FIG. 22 illustrates an example of a ROI code's output; and

DETAILED DESCRIPTION OF THE PREFERRED EMBODIMENT

In the following description, numerous specific details are set forth by way of examples in order to provide a thorough understanding of the relevant teachings. However, it should be apparent to those in the art that the present teachings may be predicted without such details. In other instances, well known methods, procedures, components, and/or circuitry have been described at a relatively high-level, without detail, in order to avoid unnecessarily obscuring aspects of the present teachings.

Figure 1:
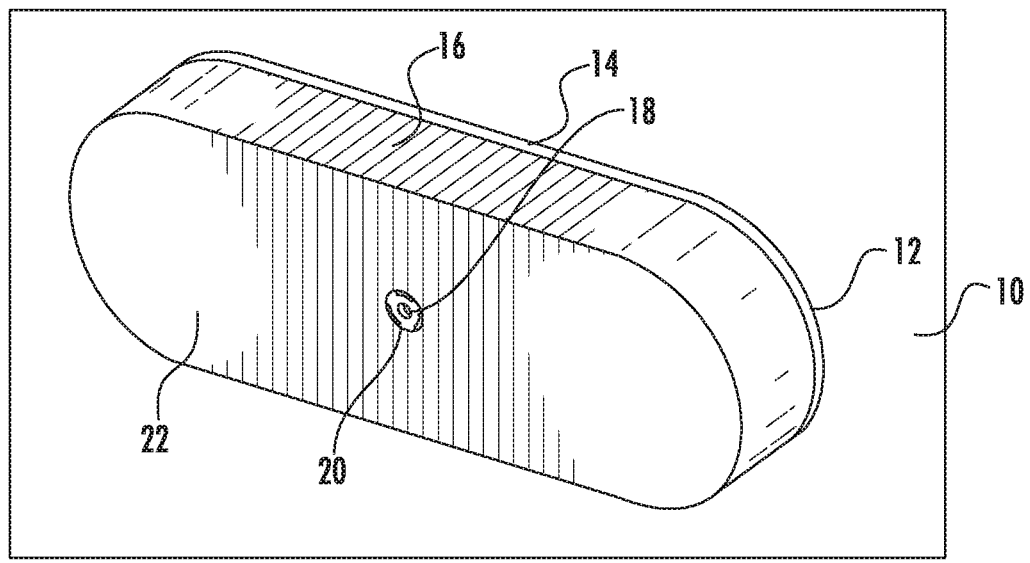
FIG. 1 depicts a perspective view of the vehicle device housing.
Figure 2:
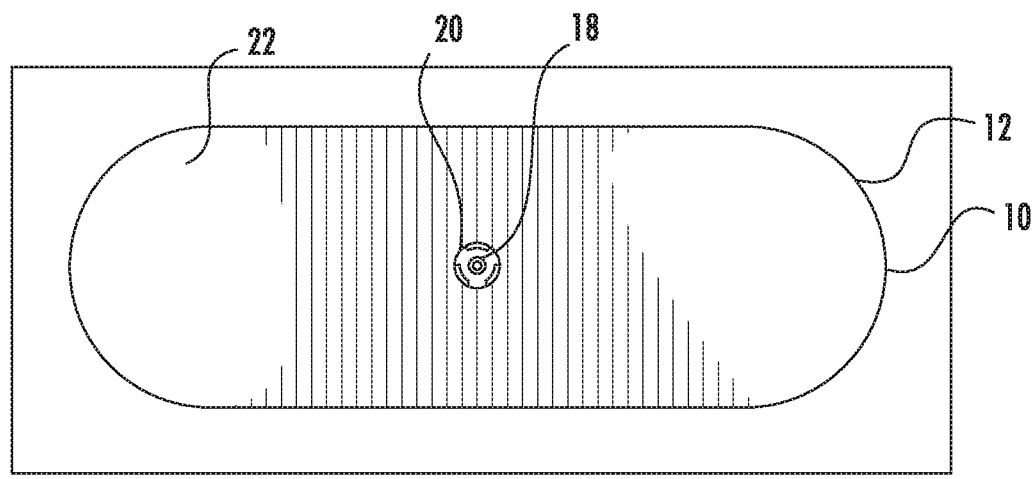
FIG. 2 depicts a front view thereof.
Figure 3:
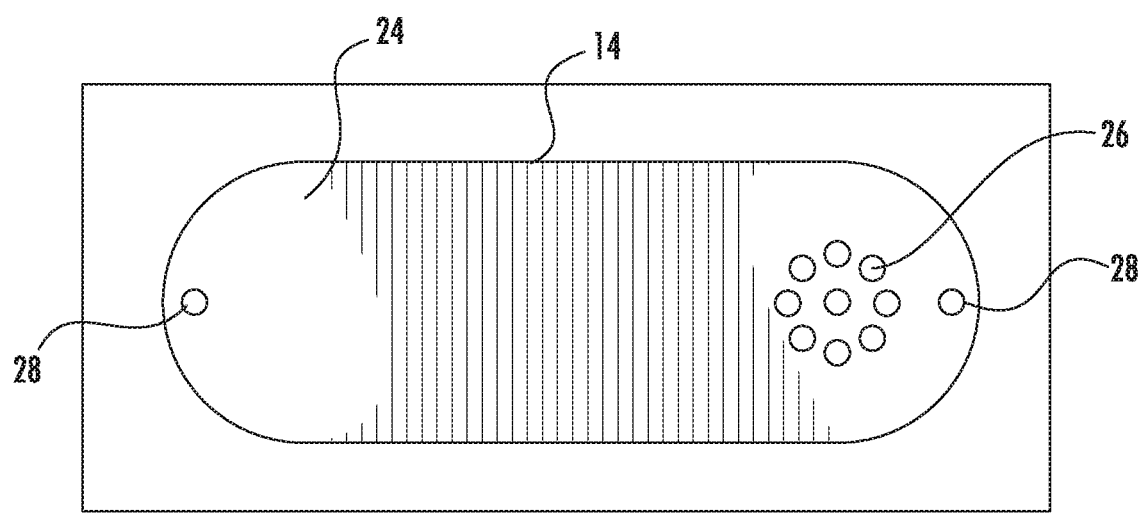
FIG. 3 depicts a back view thereof.
Figure 4:
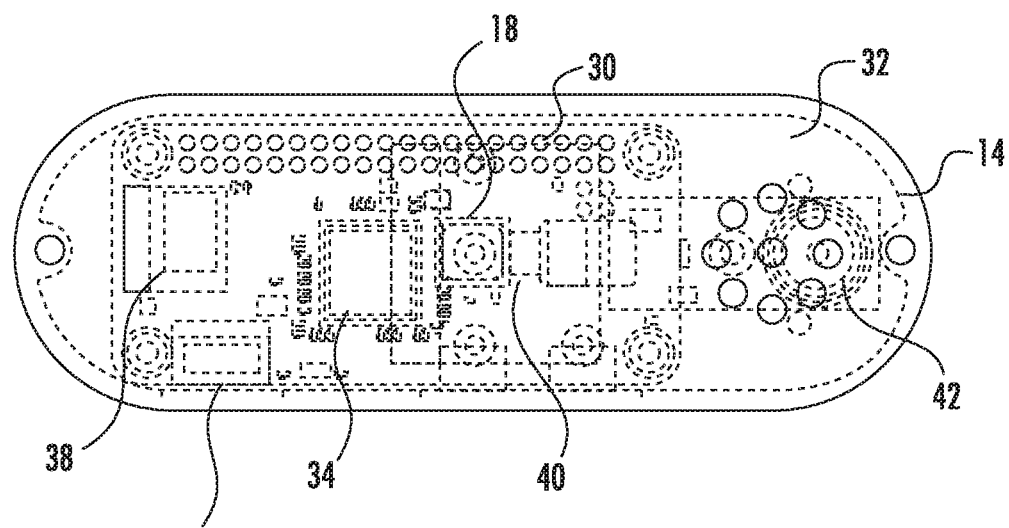
FIG. 4 depicts a circuit board layout of the device.

Referring to FIGS. 1 and 2, the device 10 of the present invention employs a support base 12 for housing various elements for use in a self-contained portable installation. The support base 12 has a mounting plate 14 with a decorative cover 16 for concealing electronics. A camera lens 18 to detect environmental changes protrudes through an aperture 20 on the front surface 22 of the cover 16. FIG. 3 illustrates the rear surface 24 of the mounting plate 14. Apertures 26 allow tones produced from an indicator function of the electronics to pass out of the support base 12. The cover 16 is secured to the mounting plate 14 by fasteners 28. FIG. 4 illustrates the electronics 30 mounted on the inner surface 32 of the mounting plate 14. Electronics used to detect an external color change include a central processing unit (CPU)/memory 34 electrically coupled to a power source 36. An accelerometer/OBD 38 is coupled to the CPU 34 and power source 36. A camera 40 is coupled to the CPU 34 and power source 36, with the camera lens 18 viewable through the cover 16. A signal device 42, such as a tone generator, is coupled to the CPU 34 and power source 36 for use in producing audible tone, such as a buzzer to indicate a function. It should be noted that the tone generator may include or be replaced with a vibrating mechanism. In an alternative embodiment, the CPU, accelerometer, camera, signal device and power supply are formed integral with a vehicle. In the preferred embodiment the camera 40 is used to capture the driver/operator's external environment. The accelerometer 38 is used to gather the dynamic conditions of a vehicle, such as moving or stopping. The audible tone generator 42 is used to alert a distracted driver/operator who does not otherwise notice the change in external environment. The CPU 34 processes and stores an algorithm and data collected through the accelerometer 38 and camera 40. The battery 36 provides continuous power to the electronics 30. The battery 36 may be rechargeable or coupled to the vehicle power supply.

Figure 5:
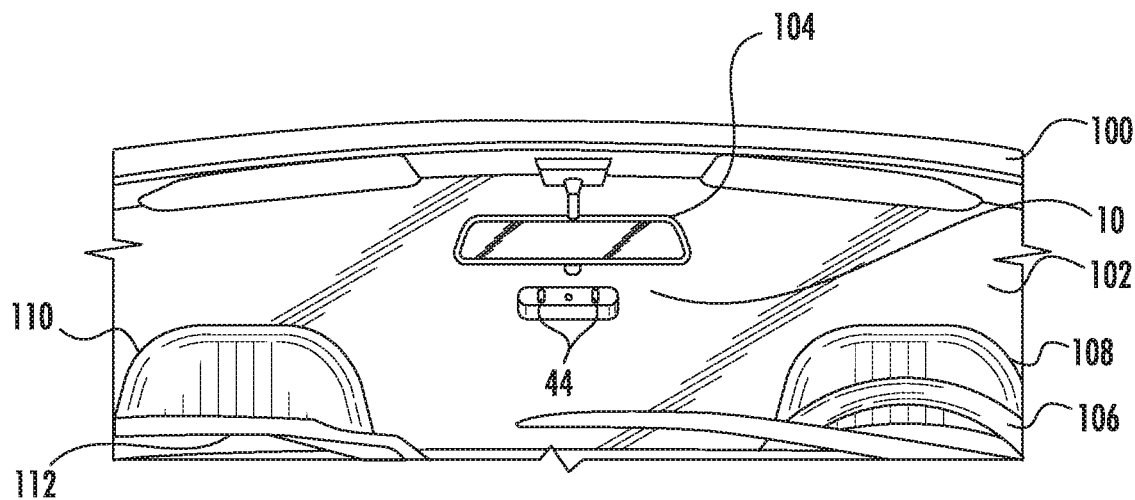
FIG. 5 depicts the device in the process of being attached to a windshield of a vehicle.
Figure 6:
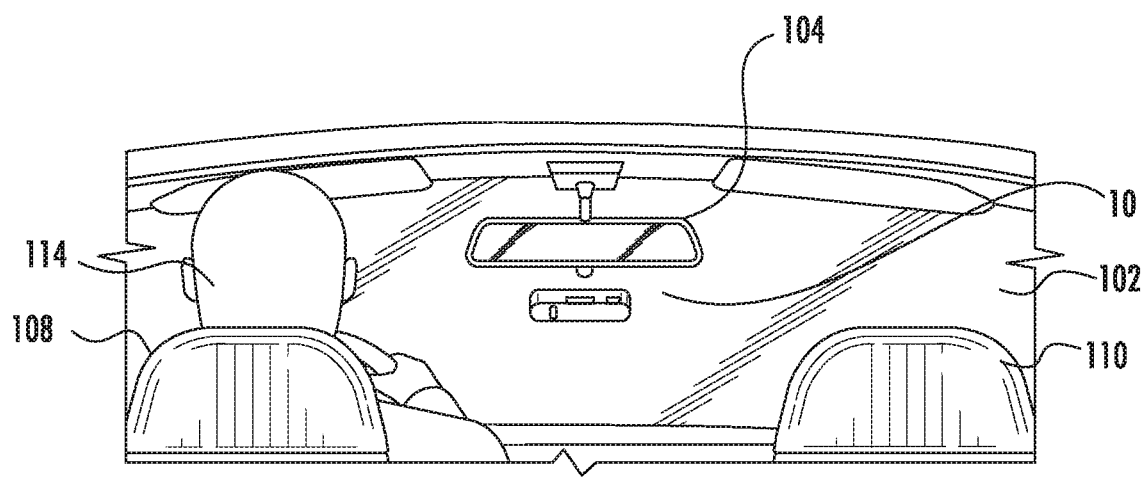
FIG. 6 depicts the device attached to a windshield of a vehicle.

FIG. 5 illustrates an example of how the device 10 can be installed as an accessory to a currently circulating vehicle 100. In this example, the device 10 is attached behind the windshield with two strips of double face tape 44. Preferably, the device 10 is mounted near the rearview mirror 104 to minimize or eliminate obstruction of the operator's view. For clarification, the illustration is from the front of the vehicle 100, depicting the steering wheel 106, front seats 108, 110, and windshield wipers 112. FIG. 6 illustrates a view of the rear of the vehicle 100, with an operator 114 occupying the seat 108 with the device 10 mounted to the windshield 102. It is again noted that other methods of installation could be implemented for the system as described, such as a separate camera mounted inside or outside of the vehicle, an OBD connector plugged in the vehicle's diagnostic port and the operator's cell phone, or an OEM vehicle's build-in system for new vehicles.

FIGS. 7-10 depict three (3) typical driver/operator external environment scenarios that the device has been designed to recognize (at least) and provide response (output) based on color variations. Figure illustrates scenario #1, also called herein Traffic Condition #1 (TC1), which depicts a driver's front view in a moving vehicle (velocity≠0) in a typical road traffic environment.

Figure 7:
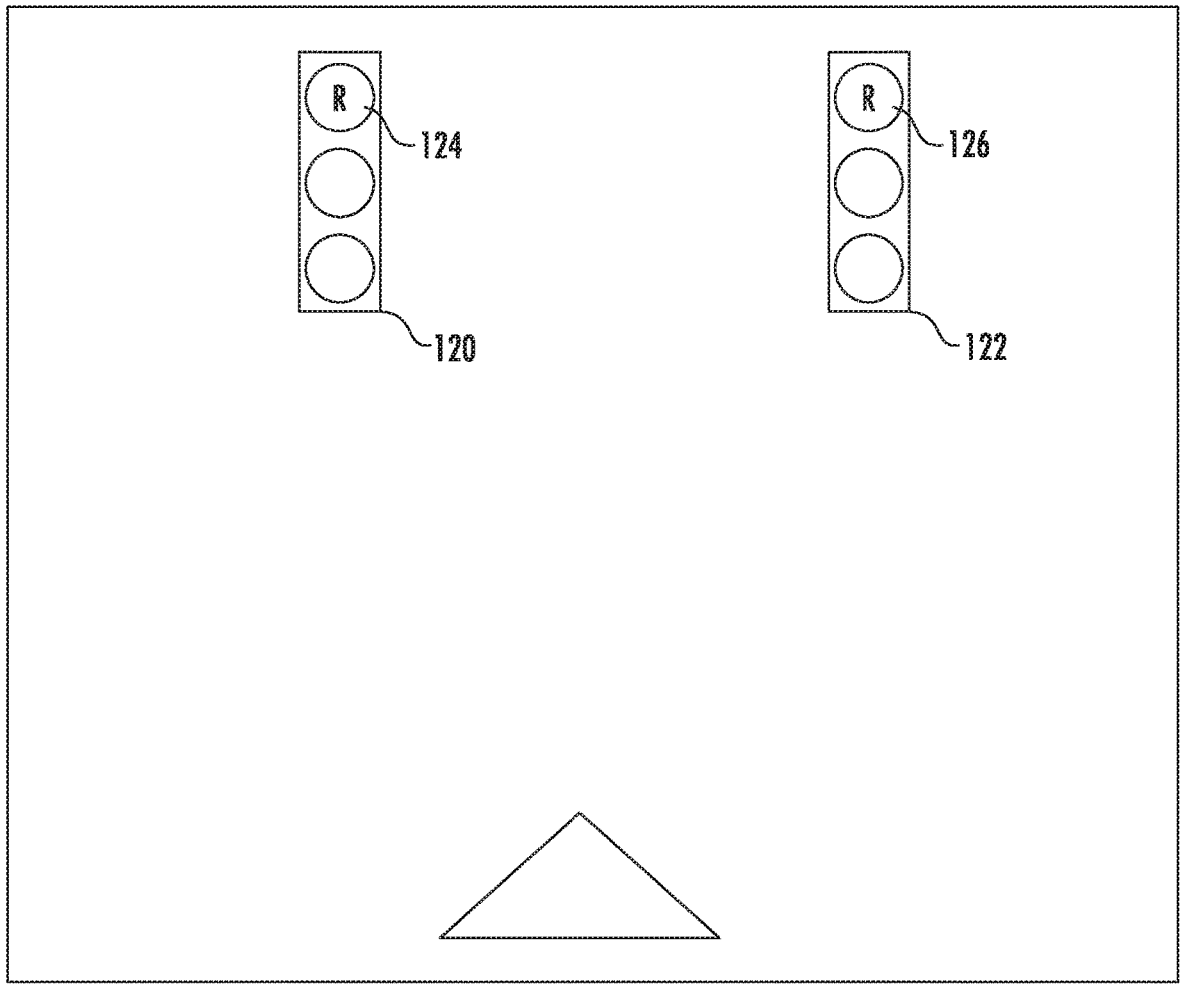
FIG. 7 depicts an example of a driver's front view, captured with the device installed in a stopped vehicle due to a traffic light showing red color with no vehicles in front.
Figure 8:
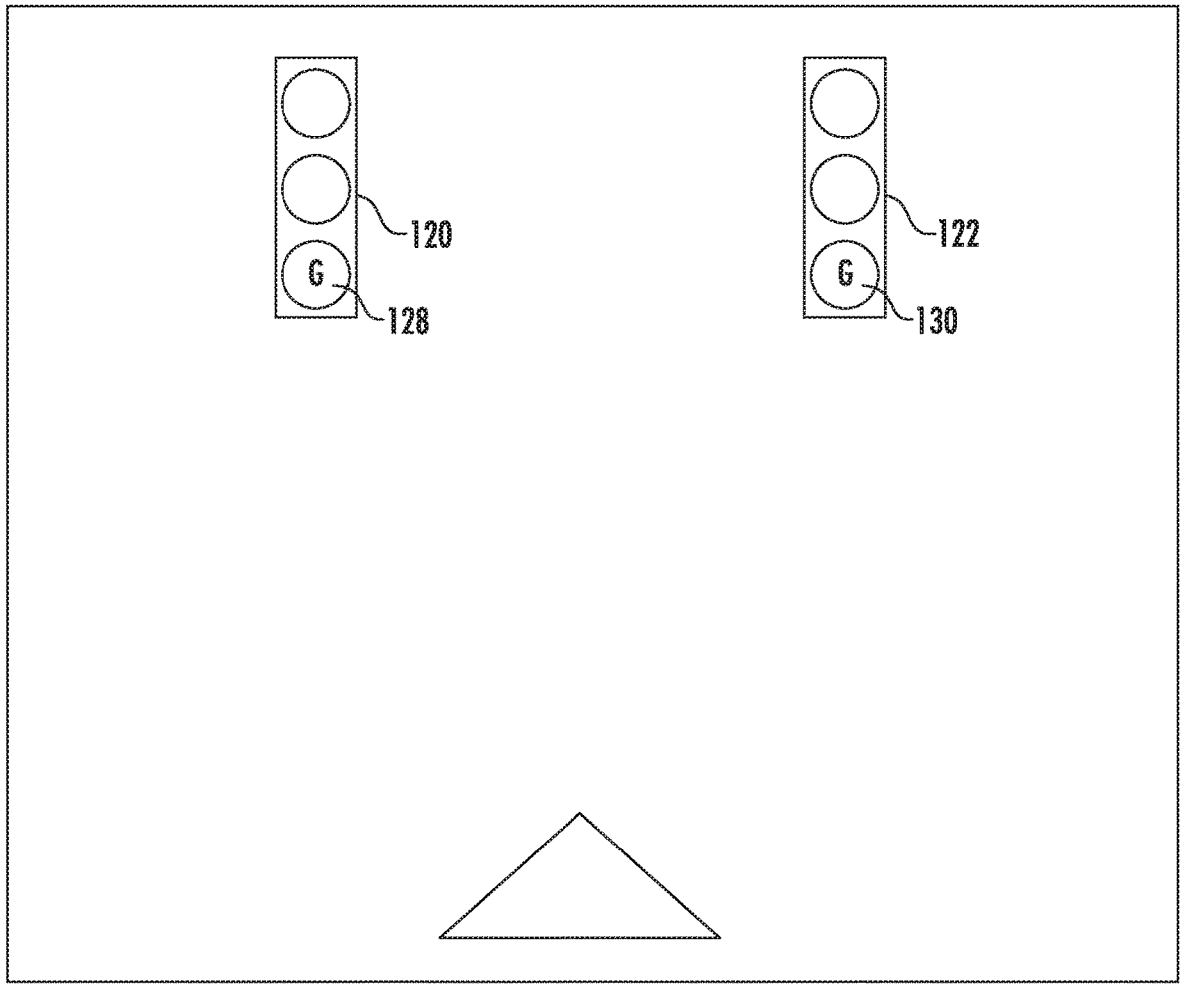
FIG. 8 depicts an example of a driver's front view, captured with the device installed in a stopped vehicle due to a traffic light showing green color with no vehicles in front.
Figure 9:
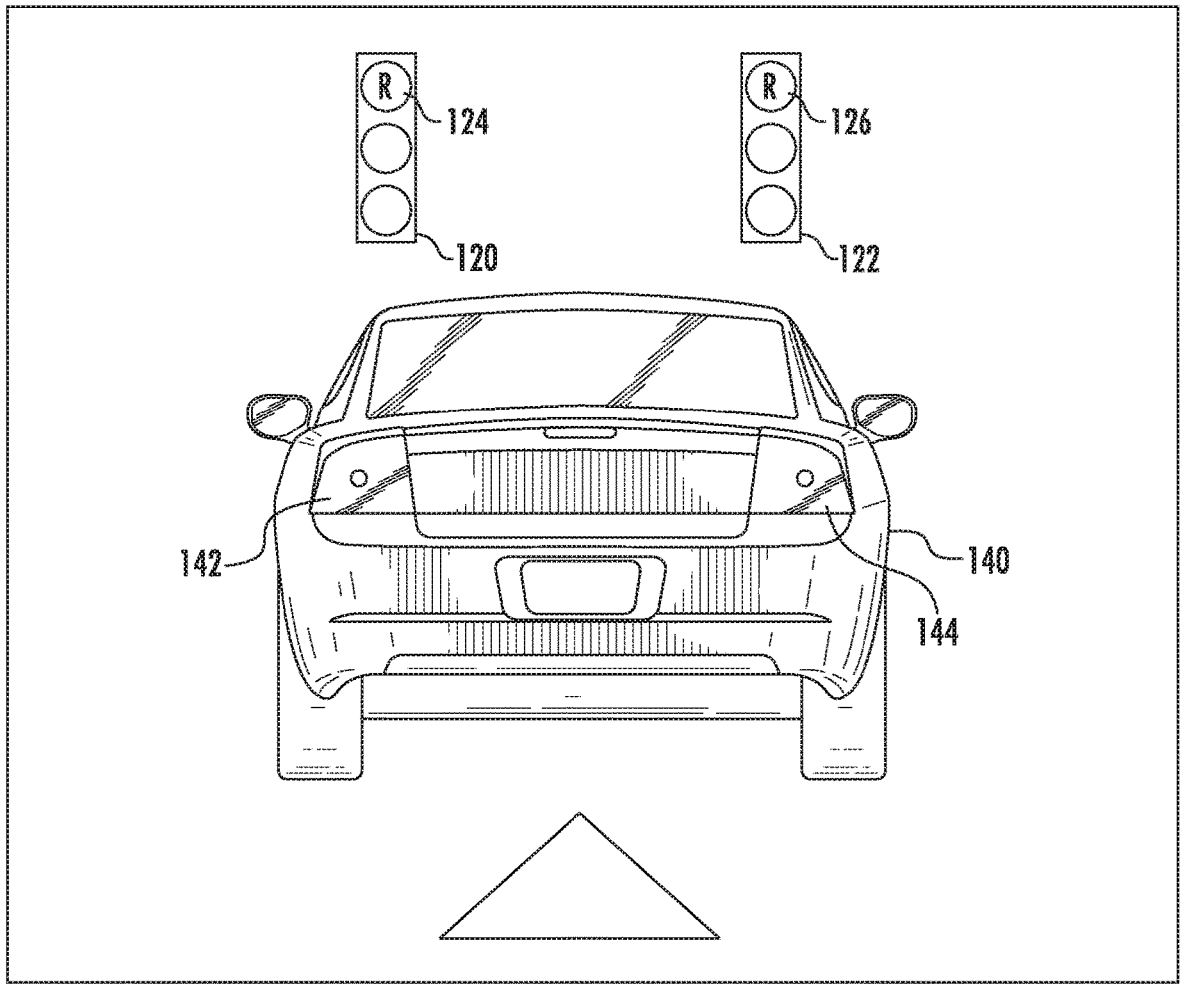
FIG. 9 depicts an example of a driver's front view, captured with the device installed in a stopped vehicle behind another stopped vehicle in the same lane with the tail-brake lights on (intense red color)
Figure 10:
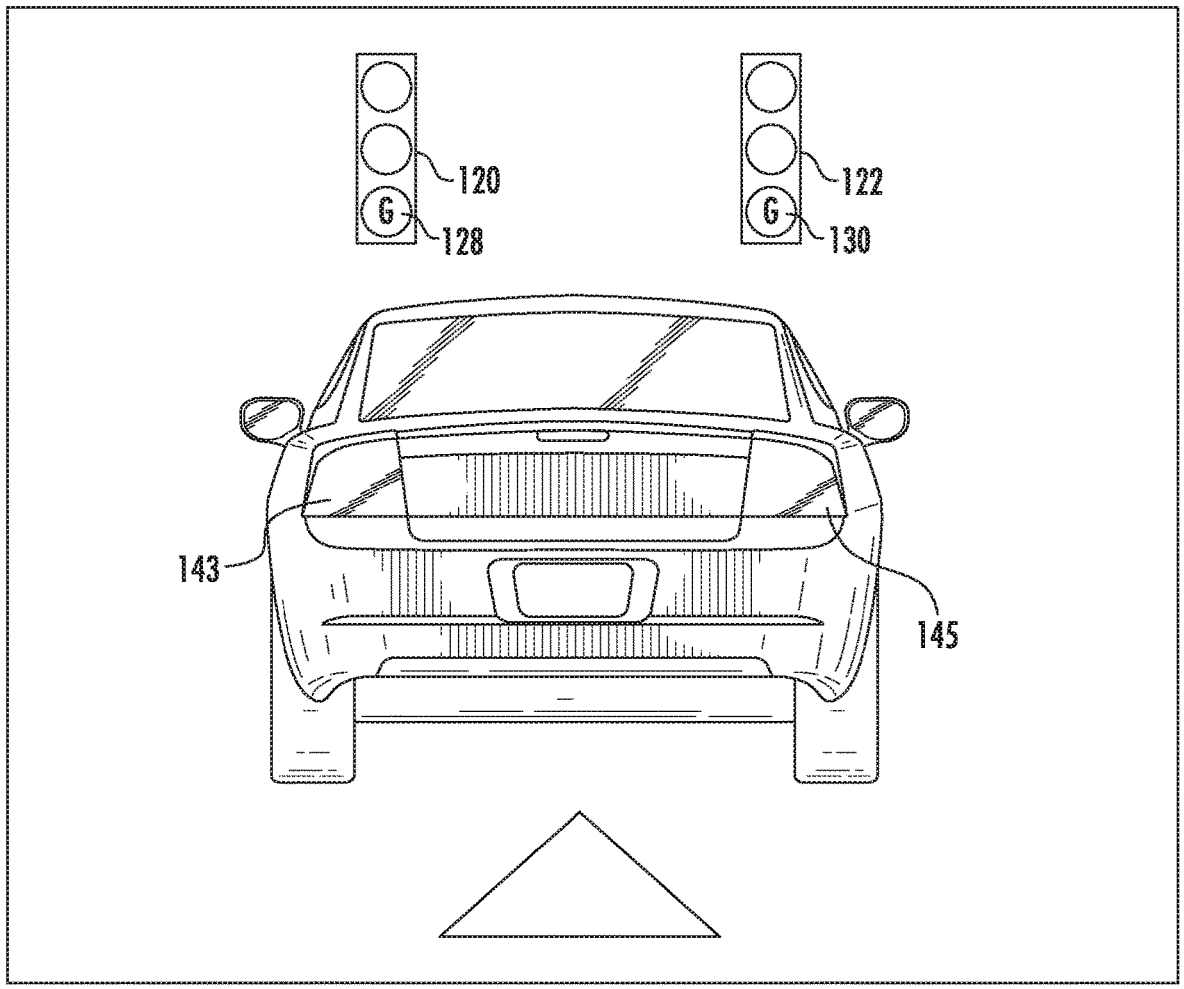
FIG. 10 depicts an example of a driver's front view, captured with the device installed in a stopped vehicle behind another stopped vehicle in the same lane with the tail-brake lights off (pale red color)
Figure 11:
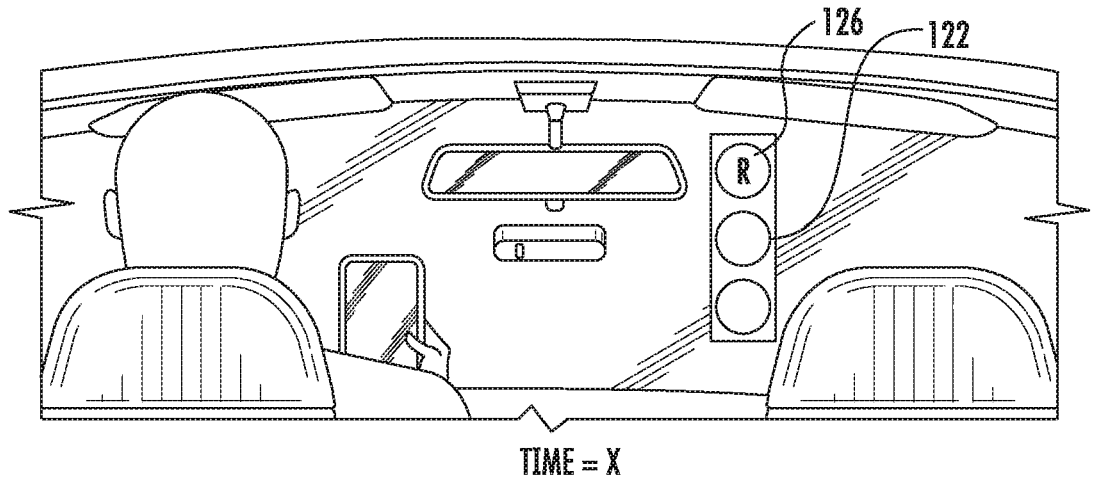
FIG. 11 illustrates an example of a driver looking at the cell phone in a stopped (non-moving) vehicle with a traffic light signal showing red color at time=x.
Figure 12:
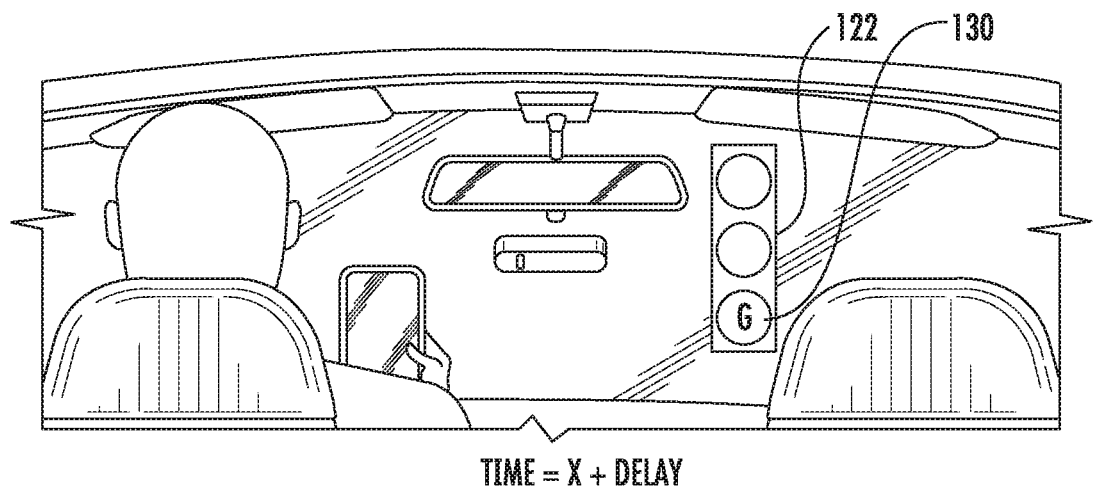
FIG. 12 illustrates an example of a driver looking at the cell phone in a stopped (non-moving) vehicle with a traffic light signal showing green color at time=x+delay.

FIGS. 7 and 8 illustrate Traffic Condition #2 (TC2) that depicts two (2) similar images captured by the device installed in a vehicle that is not moving (stopped) behind and below a traffic light signal without any vehicle in front in the same lane or driving path. Observe that, in FIGS. 7 and 11, the traffic lights 120 and 122 indicate red 124, 126; and in FIGS. 8 and 12, the traffic lights are showing green color 128, 130. FIGS. 9 and 10 illustrate Traffic Condition #3 (TC3) that depicts similar images captured by the device installed in a vehicle that is not moving (stopped) and is behind another stopped vehicle in the same lane or driving path. Observe that, in FIG. 9, the tail-brake red lights 142, 144 of the front vehicle 140 are on and the traffic lights 120, 122 indicate red 124, 126; and, in FIG. 10, the tail lights 143 and 145 are off, and the traffic lights 120, 122 indicate green 128, 130.

Figure 13:
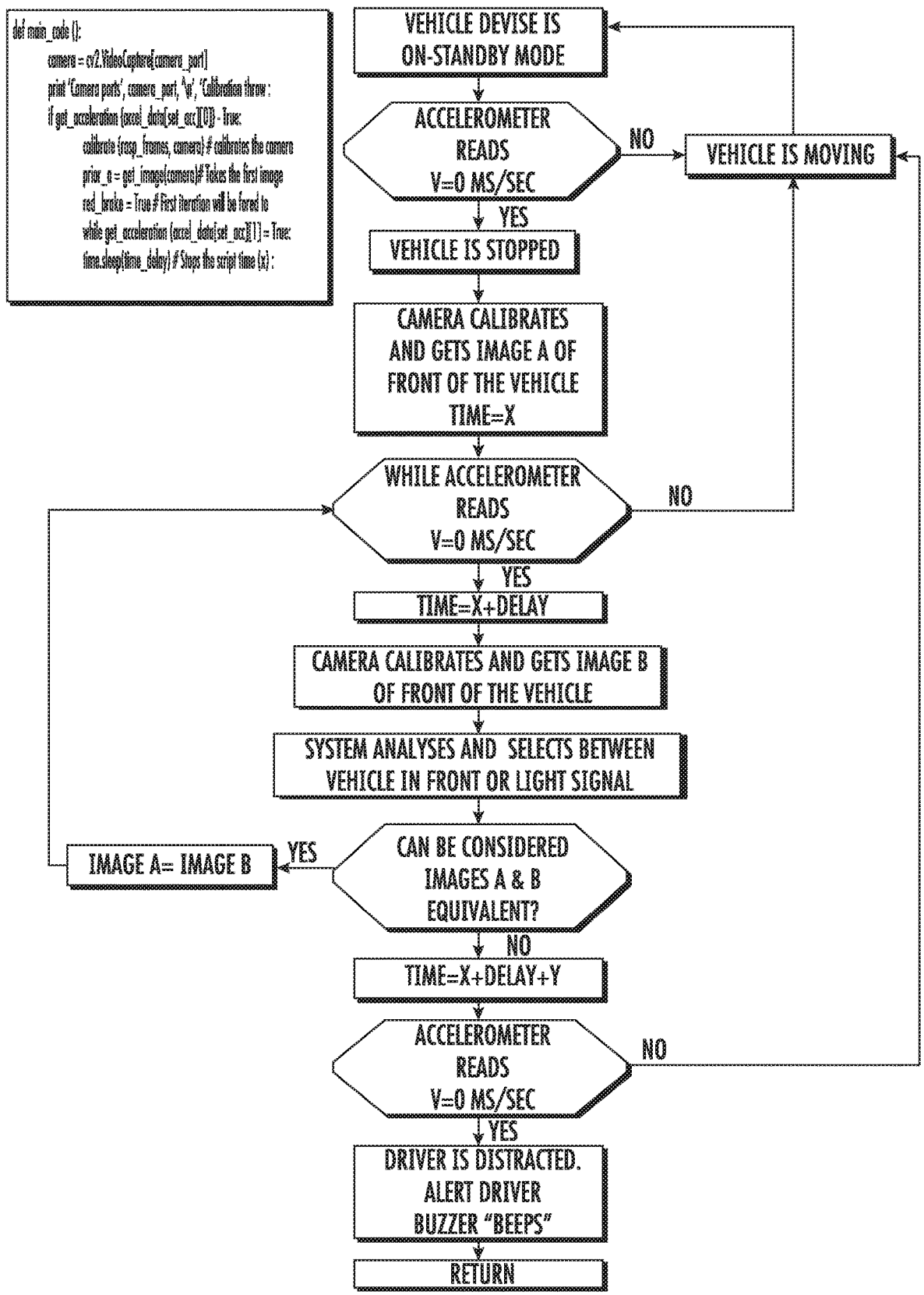
FIG. 13 describes, in the form of a flow chart, an example of an overall process of this invention with pieces of code.
Figure 14:
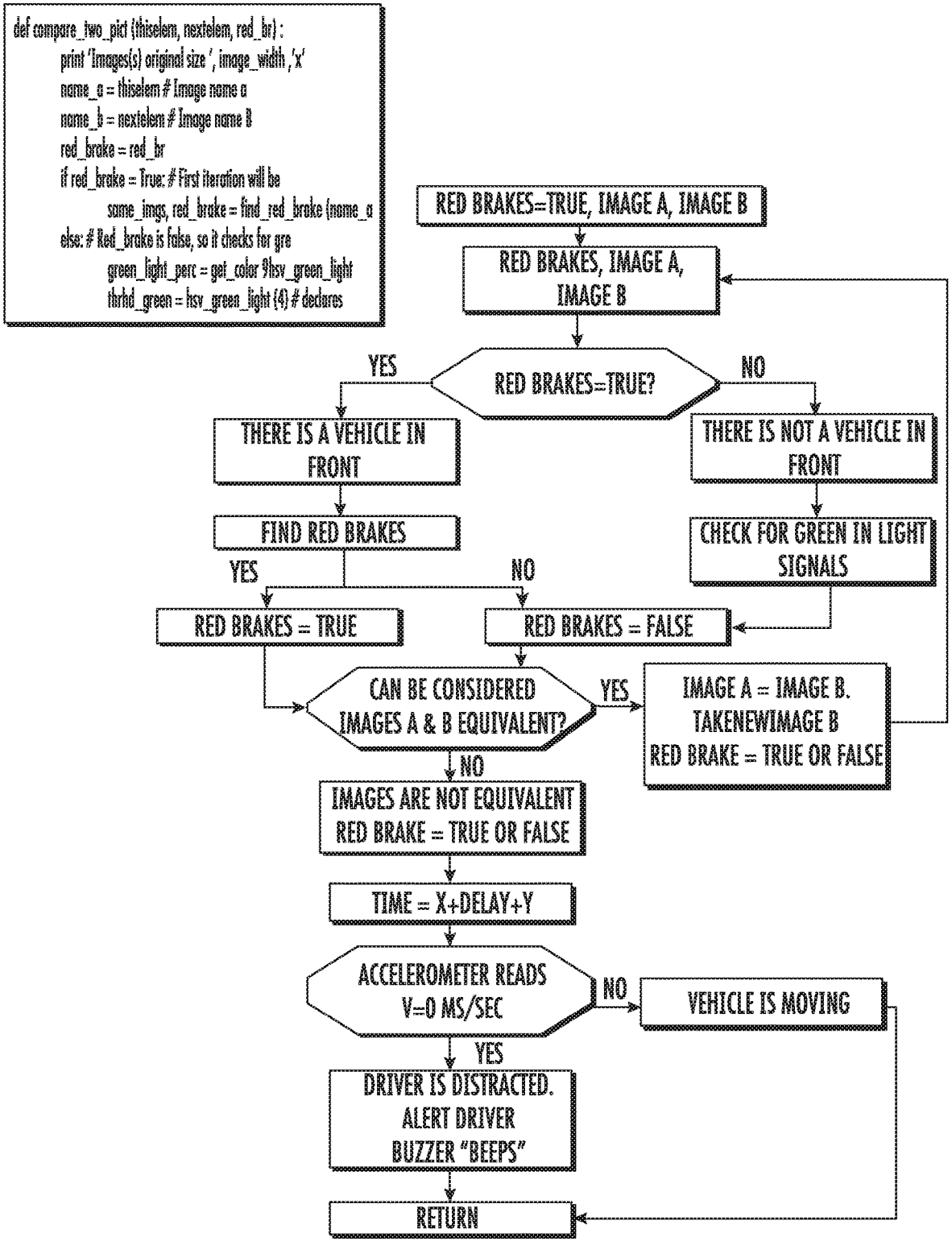
FIG. 14 describes in the form of a flow chart, an example of a process for analysis and selection of the traffic condition with pieces of code.
Figure 15:
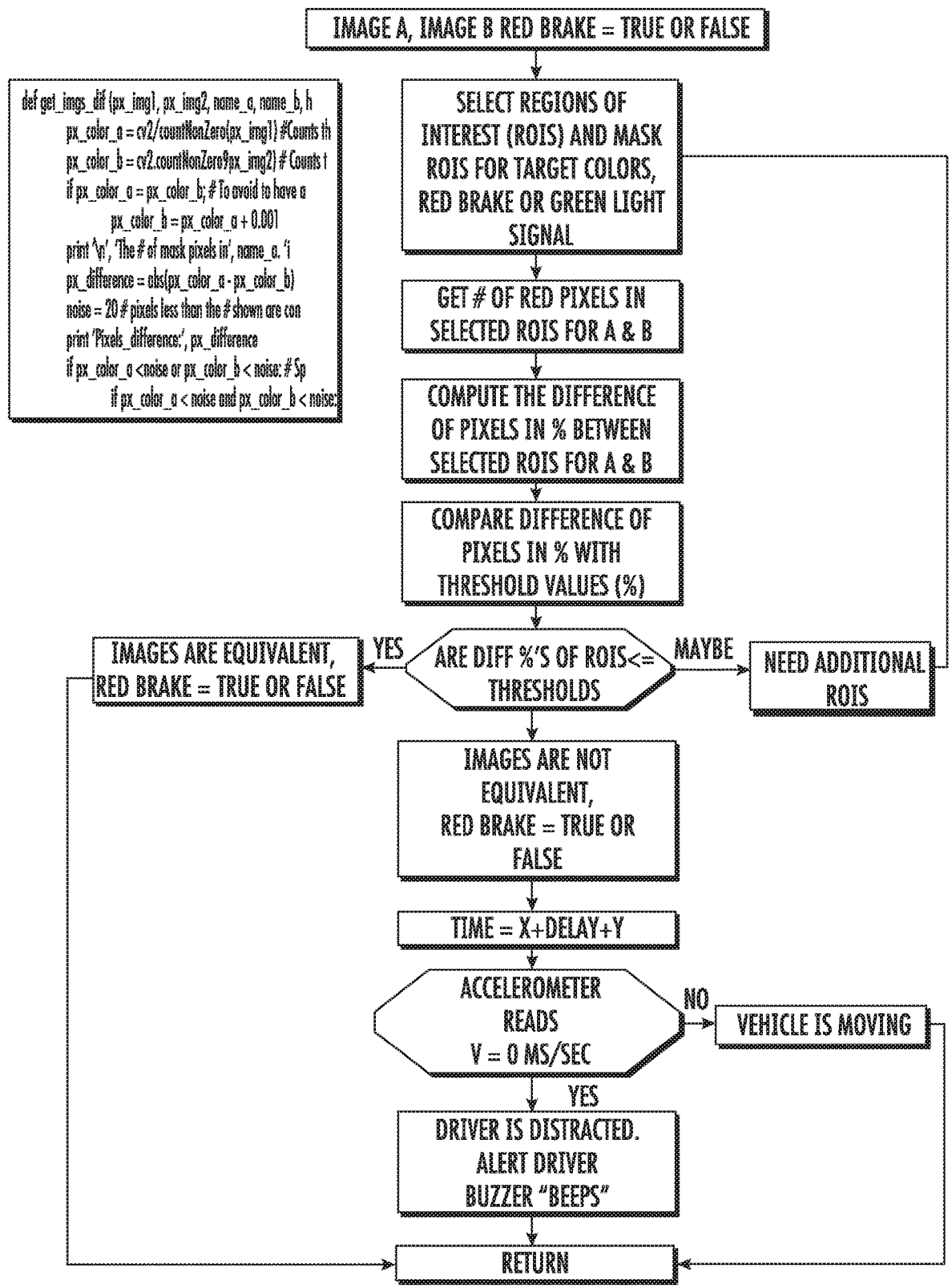
FIG. 15 describes in the form of a flow chart, an example of a process for analysis and determination of the equivalency between two images with pieces of code.
Figure 16:
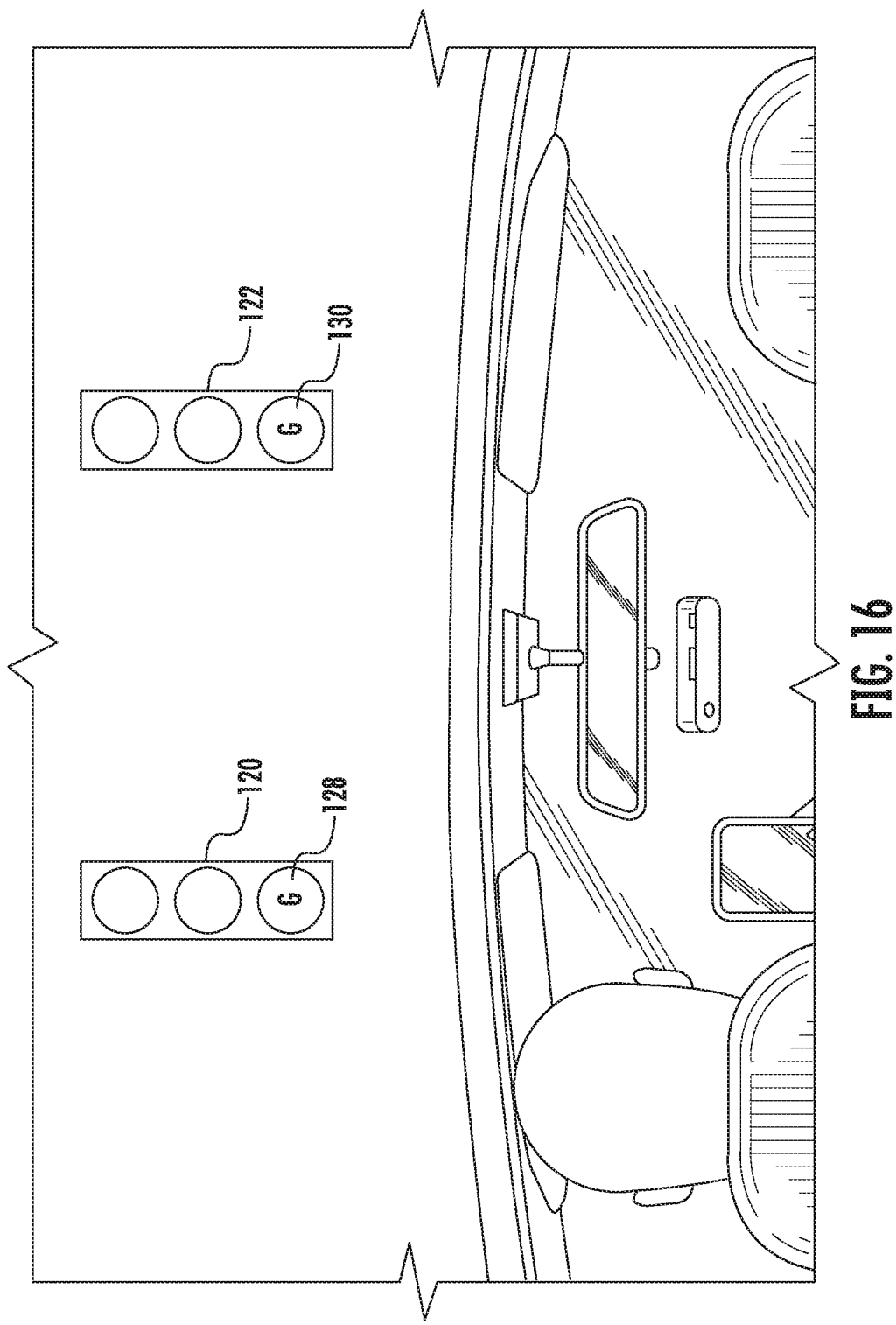
FIG. 16 illustrates, as an example, the Regions Of Interest (ROI) selected for traffic light signals.

FIGS. 13-15 illustrate an example of the critical processes in form of flow diagrams supported by pieces of code. In the preferred embodiment, the system runs only when the driver sets the device in On-standby mode. The system runs, and its accelerometer/OBD captures the velocity of the vehicle at regular intervals. While the accelerometer/OBD gathers velocities≠0, the system assumes that the vehicle is in motion and keeps obtaining velocities indefinitely until the velocity=0 or the system is disconnected (Off-mode). In the case that the vehicle is moving, the system detects Traffic Condition #1 (TC1) and no feedback is provided to the driver. Otherwise, if the system detects that the vehicle is stopped (velocity=0), the system calibrates the device's camera and captures the first image (image A) of the driver/operator's front view and temporarily stores it for further analysis.

Next, the system prepares to take the next image (image B). Prior to taking image B, the system re-evaluates whether the vehicle is in motion. In the case where it is found that the vehicle is in motion, the image A is deleted, no feedback is provided to the driver/operator, and the system starts the process again. Otherwise, the system decides that the vehicle remains stopped, captures image B, and temporarily stores it for further analysis.

Next, the device analyzes images A and B for selection of Traffic Condition #2 (TC2) or #3 (TC3). For the analysis, the system uses computational image recognition methods to determine the best match to the traffic conditions noted, based on the existence of a targeted color within targeted regions of interest (ROIs). The system analyzes and returns the best match traffic condition based on the red color found, at the tail-brake light region of the vehicle in front (TC3) or the green color found at the light signals (TC2). Illustrated are some examples of ROIs that the device uses for TC2 and TC3 detection. Once the system has selected the best match traffic condition, the system will keep it for further image analysis and discard the previous image to avoid unnecessary analysis and computer time.

Next, the system prepares to determine whether images A and B can be considered equivalent or not equivalent and, if not equivalent, potentially alert the driver. For example, the system will consider two (2) images not equivalent if a light signal shows red in image A and shows green in image B, or the tail-brake lights of a vehicle in front are brighter in image A (brake lights are on) compared to image B (brake lights are off). Prior to executing the equivalency analysis, the system re-evaluates whether the vehicle is in motion. In the case that it is found that the vehicle is in motion, images A and B are deleted, no feedback is provided to the driver, and the system starts the process again. Otherwise, the system decides that the vehicle remains stopped and proceeds with the analysis. The system uses computational image recognition methods to determine whether two images, in this case A and B, are equivalent. Image equivalency is based on TC2 and TC3, and variance of the targeted color of the same ROI compared to a threshold. If the ratio of a color between images for the same ROI is within the threshold, the system considers that the images are equivalent, or otherwise are not equivalent. In some cases, the system might require to analyze additional ROIs if the analysis is considered unclear. For example, undesired color changes such as reflections, or the angle of light incidence, might occur due to sudden changes in the sky conditions (i.e.: moving clouds), dirty windshields or the lights of another vehicle at night. It has been found that these phenomena have different effects in the amount of the targeted color when comparing two images and might result in wrong decisions. In these cases, it? is found more accurate to analyze at least three (3) ROIS to provide an unbiased and more accurate result.

Figure 17:
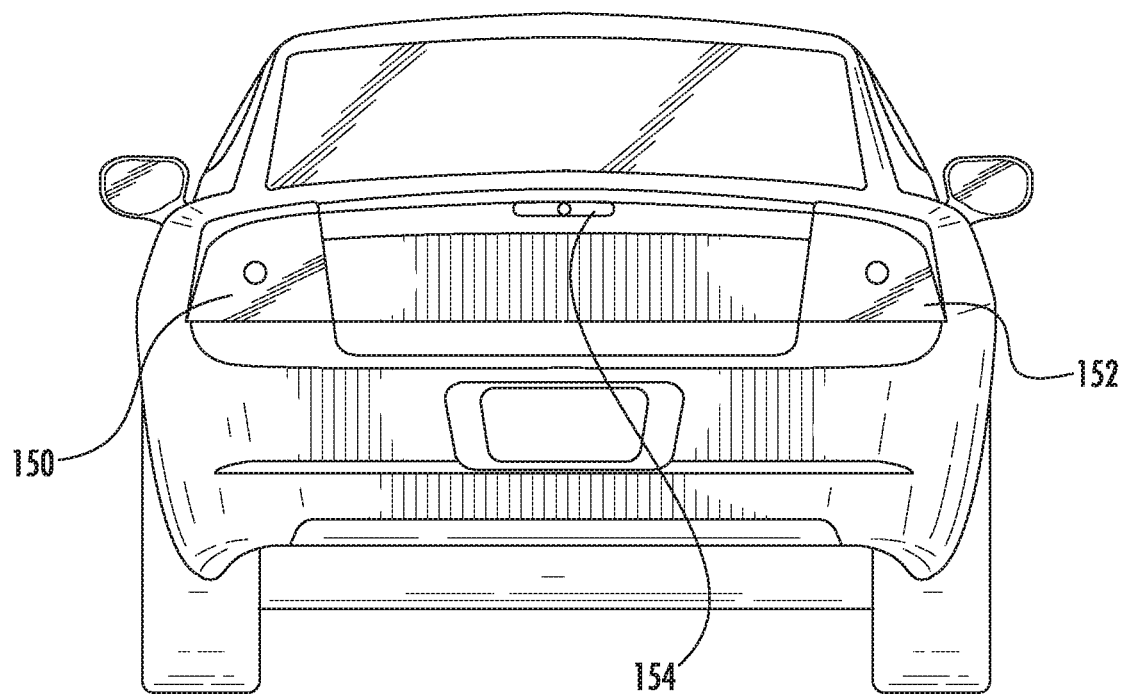
FIG. 17 illustrates, as an example, the Regions Of Interest (ROI) selected for vehicle tail-brake light zone.
Figure 18A:
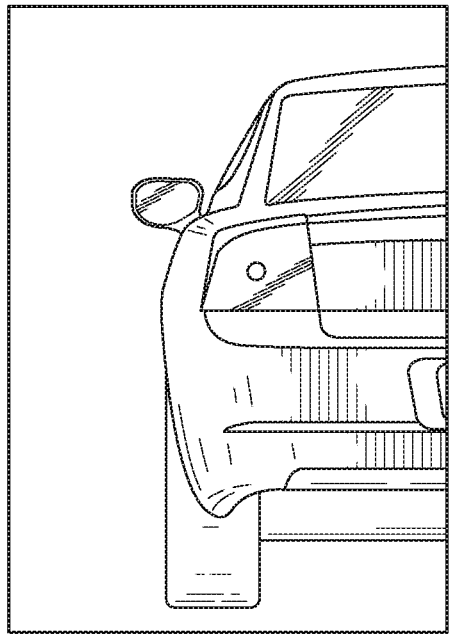
FIG. 18a is a visual image of a left brake.
Figure 18B:
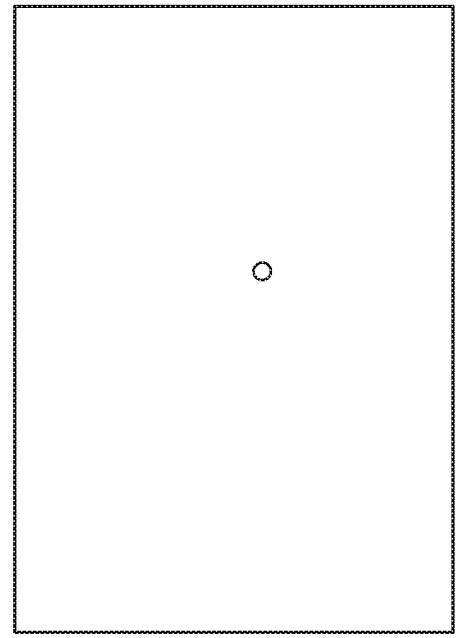
Figure 19A:
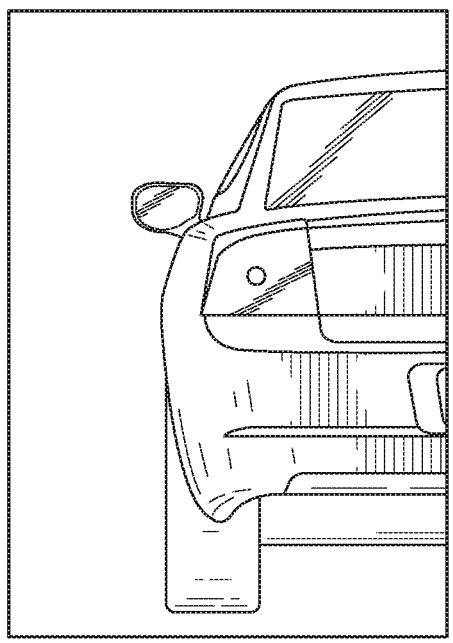
FIG. 19a is a visual image of a left brake with a time delay.
Figure 19B:
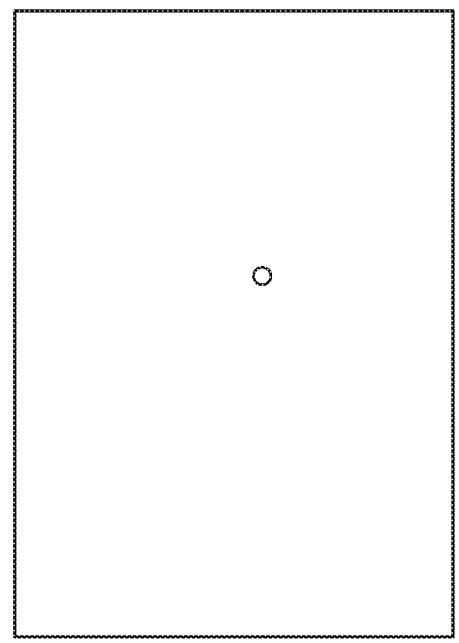
Figure 20A:
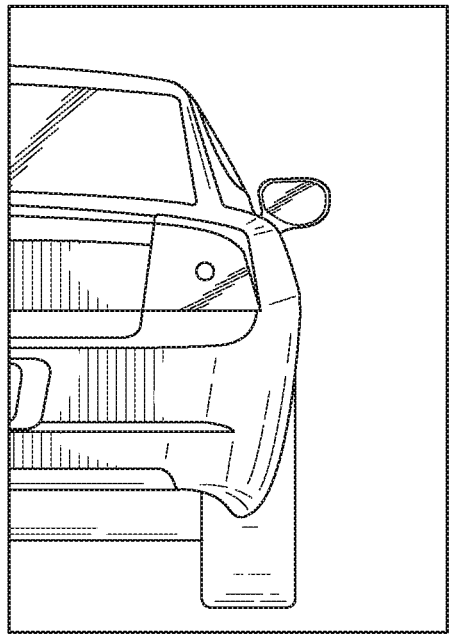
FIG. 20a is a visual image of a right brake.
Figure 20B:
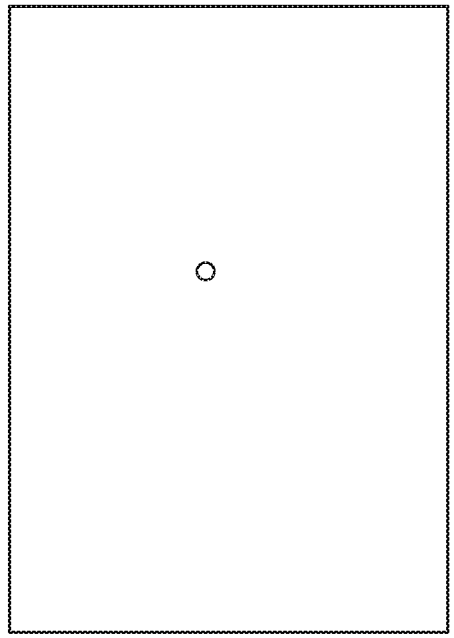
Figure 21A:
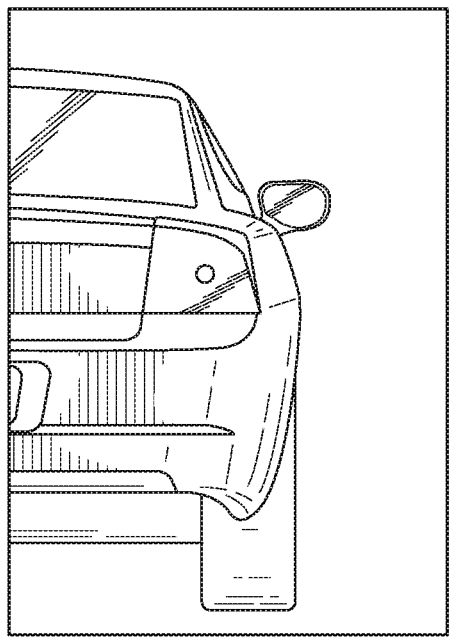
FIG. 21a is a visual image of a right brake with a time delay.
Figure 21B:
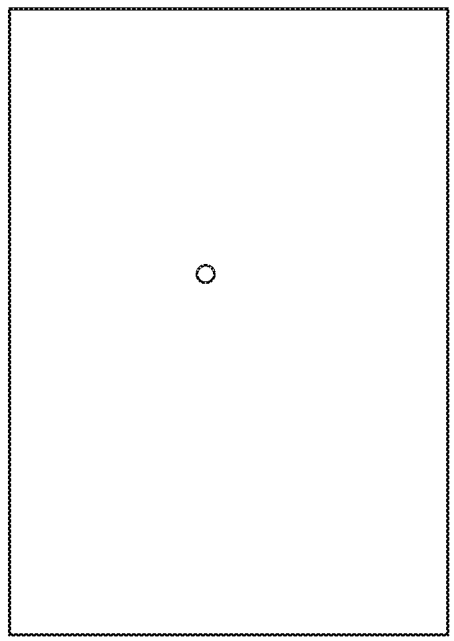

FIGS. 18-21 illustrate, as an example, the comparison between image A and image B for the left and right brake ROIs of a vehicle. FIG. 18a illustrates a vehicle at time X having a left brake on, FIG. 18b illustrates a mask of 18a capturing the light image. FIG. 19a illustrates a vehicle at time X+delay having a left brake on, FIG. 19b illustrates a mask of 18a capturing the light image. FIG. 20a illustrates a vehicle at time X having a right brake on, FIG. 20b illustrates a mask of 20a capturing the light image. FIG. 21a illustrates a vehicle at time X+delay having a right brake on, FIG. 21b illustrates a mask of 21a capturing the light image. A code output for this scenario is listed in FIG. 22. FIG. 17 depicts the use of three brake lights, the left brake light 150, the right brake line 152, and a center brake light 154. Each of the illuminated brake lights can be masked for detection by the CPU.

Figure 23:
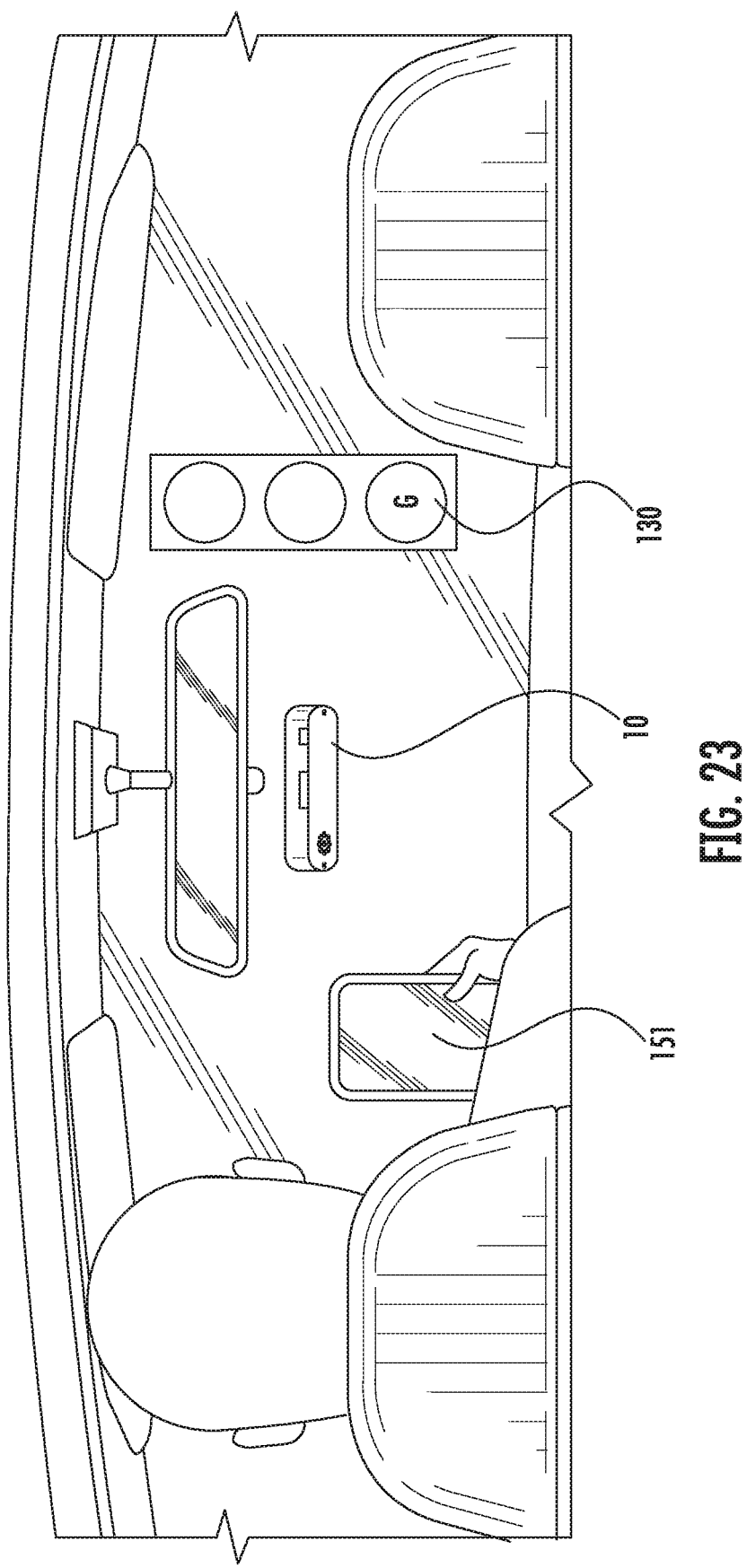
FIG. 23 depicts an example of a driver looking at a cell phone in a stopped vehicle with a traffic light signal showing green color and the device buzzing a "beep" at time=x+delay+y.

In the case that images A and B are found not equivalent, the device prepares to notify and alert the driver/operator of a color change in the external environment (FIG. 23). The system predicts that the driver/operator is distracted when her time of response to the external environment color change exceeds a threshold time (time=x+delay+y), for example, red-to-green color change in the case of traffic light signals. Typically, this occurs when the operator is texting or otherwise using a smart phone 151. If the threshold time is not met and the system detects that the vehicle is moving, the system will not alert the driver/operator. Otherwise, if the threshold time is exceeded and the vehicle still remains stopped, the device predicts that the driver/operator is distracted and will trigger the buzzer and/or vibration to alert him or her of the external environment color change. In an alternative embodiment, the CPU relied upon may be located in a mobile smart phone 151 and use Bluetooth or the like to interface with an accelerometer and camera secured to the vehicle; the mobile smart phone having an App installed to process the previously mentioned images and acceleration movements and render an audible signal or vibration movement should the operator of the vehicle remain stationary after an environmental change.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A device to detect an external color change for a stopped vehicle comprising:
    a central processing unit (CPU)/memory and a power source mounted to a support base coupled to the vehicle;
    an accelerometer/on-board diagnostics (OBD) coupled to said CPU for capturing the velocity of the vehicle at predetermined intervals;
    a camera coupled to said CPU, said camera obtaining an image in front of the vehicle when said accelerometer/OBD indicates that the velocity of the vehicle is zero, said CPU identifying a target color from said image in front of the vehicle; and
    a signal device coupled to said CPU;
    wherein said CPU annunciates said signal device when said target color changes while the velocity of the vehicle remains zero whereby said CPU disables said camera when the velocity of the vehicle is not zero.

2. The device to detect an external color change according to claim 1, wherein said support base is secured to the front of the vehicle.

3. The device to detect an external color change according to claim 1, wherein said support base is removably secured to a windshield of the vehicle.

4. The device to detect an external color change according to claim 1, wherein said accelerometer/OBD gathers velocities and said CPU determines if the vehicle is in motion and repeatedly interviews velocities to detect a change in velocity.

5. The device to detect an external color change according to claim 1, wherein said CPU employs computational image recognition to determine the existence of a target color to match a traffic condition.

6. The device to detect an external color change according to claim 5, wherein said traffic condition is a brake light.

7. The device to detect an external color change according to claim 5, wherein said traffic condition is a traffic light signal.

8. The device to detect an external color change according to claim 6, wherein said target color is red.

9. The device to detect an external color change according to claim 7, wherein said target color is green.

10. The device to detect an external color change according to claim 8, wherein said color is red and compared between images to detect a brighter red indicative of a brake light.

11. The device to detect an external color change according to claim 1, wherein said CPU annunciates said signal device if the velocity of the vehicle is zero and the target color change exceeds a threshold time.

12. The device to detect an external color change according to claim 1, wherein said signal device provides a sound, vibration, or light to indicate external color change.

13. The device to detect an external color change according to claim 1 including a support base for housing said CPU, accelerometer, camera, signal device and power supply, whereby said support base is self contained and releasably secured to a windshield of a vehicle.

14. The device to detect an external color change according to claim 1, wherein said CPU, accelerometer, camera, signal device and power supply are formed integral with a vehicle.

15. The device to detect an external color change according to claim 1, wherein said CPU is located in a mobile smart phone integrated with said accelerometer and camera secured to the vehicle.

* * * * *